Dec. 26, 1933.  F. ACKERMAN  1,941,240
LIFTING APPARATUS
Filed June 29, 1931
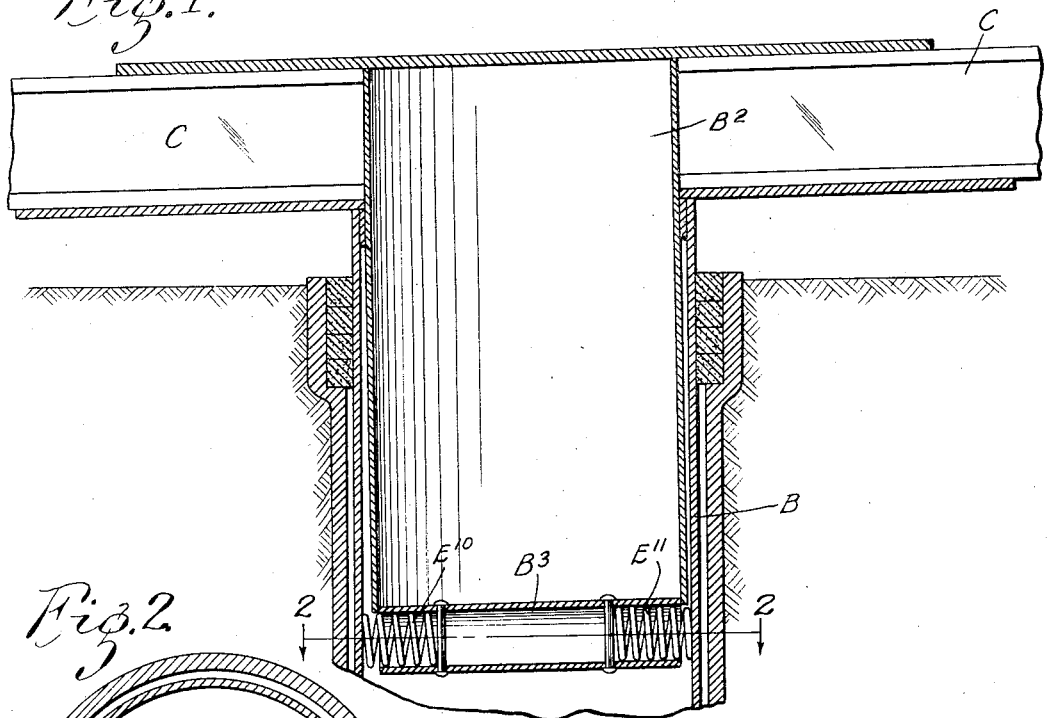
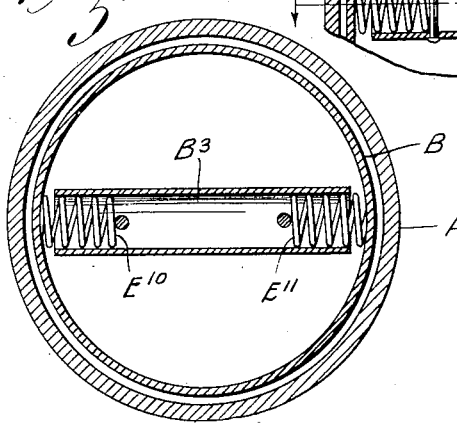
INVENTOR
FRANK ACKERMAN.
BY Bakewell & Church
ATTORNEYS Patented Dec. 26, 1933

1,941,240

UNITED STATES PATENT OFFICE 1,941,240

LIFTING APPARATUS

Frank Ackerman, St. Louis, Mo., assignor to Curtis Manufacturing Company, Wellston, Mo., a corporation of Missouri Application June 29, 1931. Serial No. 547,529

1 Claim. (Cl. 254—93)

This invention relates to hydraulic elevators and automobile lifts of the kind that comprise a relatively long platform or chassis engaging structure carried by a vertically-disposed reciprocating piston or plunger.

In one type of lifting apparatus of the general character above referred to, the platform is rigidly attached to the upper end of the piston, and in another type of such lifting apparatus, the platform is pivotally mounted or rockably mounted on the piston, so as to permit the platform to tilt or cant without causing any side strain on the piston, as illustrated and described in U. S. Patent No. 243,391, to William H. Milliken, dated June 28, 1881.

My invention relates to lifting apparatus of the general type or design described in said Milliken patent, and has for its main object to eliminate undue tetering, rocking or tilting of the platform relatively to the piston, and maintain the platform in a substantially level or horizontal position when the piston is being raised and lowered. I have herein illustrated my invention embodied in a lifting apparatus of the type commonly referred to as an automobile lift, that is intended to be used for sustaining a vehicle in an elevated position while the chassis of the vehicle is being inspected or worked on, and which comprises a relatively long platform or chassis engaging structure designed to be engaged by an automobile chassis at a plurality of widely separated points, and mounted on the upper end of a vertically-movable piston, a resilient means such as a spring or springs being used to prevent undue tetering of the platform and tend to hold the platform in a level position.

In my improved lifting apparatus the platform or supporting structure of the apparatus will cant or tilt slightly relatively to the piston, in the operation of raising a vehicle, in the event the axle supporting means at one end of the platform engages its co-operating axle before the other axle supporting means at the opposite end of the platform has engaged its axle, thereby effectively preventing the piston from being subjected to a thrust tending to cause it to bind in its cylinder, and the resilient means or equivalent means that is used to prevent undue tetering of the platform, will restore or tend to restore the platform to its normal horizontal or level position after both axles of the vehicle have been engaged by the axle supports on the platform. During the continued upward movement of the piston the said means effectively prevents the platform from tetering or rocking unduly, and hence, my apparatus is a decided improvement on the lifting apparatus disclosed in the Milliken patent, previously referred to. In the operation of lowering a vehicle the platform cants or tilts sufficiently relatively to the piston, after one pair of wheels of the vehicle have come in contact with the ground, to prevent the unequal load on the platform causing the piston to be subjected to an excessive side strain, resulting in the piston binding in its cylinder.

Figure 1 of the drawing is a vertical sectional view of a lifting apparatus constructed in accordance with my present invention.

Figure 2 is a horizontal sectional view taken on the line 2—2 of Figure 1.

In Figure 1 of the drawing, A designates a vertically-disposed cylinder set in the ground, in a floor or in any other suitable base, and provided with a vertically-movable piston B that is adapted to be moved upwardly and downwardly so as to raise and lower a load sustained by the piston. A platform or supporting structure C of any preferred design or construction, is mounted upon the upper end of the piston B. If the apparatus is intended to be used primarily for sustaining a vehicle in an elevated position while the chassis of the vehicle is being inspected or worked on, the platform will be provided at one end with a suitable axle supporting means that is adapted to co-operate with one axle of the vehicle that is to be raised, and provided at its opposite end with a suitable axle supporting means that is adapted to co-operate with the rear axle of the vehicle.

The platform C is mounted on the piston B in such a manner that said platform is capable of canting, tilting or rocking slightly relatively to the piston, under certain conditions, and springs or an equivalent means is combined with said piston and platform so as to restore or tend to restore the platform to its normal or approximately normal position and prevent it from tetering or rocking unduly during the vertical movement of the piston.

In the form of my invention herein illustrated the piston B is provided at its upper end with an upwardly-projecting spindle or extension $B^2$ that is capable of rocking slightly and assuming an angular position with relation to the piston, and the platform C is rigidly connected to said spindle or extension $B^2$. In order to restore the platform, maintain it in a substantially horizontal or level position and prevent it from tetering during the major portion of the stroke of the piston, in either direction, as previously explained, the rockable or shiftable spindle B² at the upper end of the piston B is provided at its lower end with a head piece B³ that carries springs E¹⁰ and E¹¹, arranged in front of and at the rear of the axis of movement of said spindle, and disposed so that they will bear against the inner surface of the side wall of the portion of the piston in which said spindle is positioned, said springs being of such tension as to permit the platform to tilt or rock relatively to the piston under certain conditions, but to restore and normally maintain the platform in a level or substantially level position.

Having thus described my invention, what I claim as new and desire to secure by Letters Patent is:

A lifting apparatus, comprising a vertically-movable piston arranged in a cylinder, a spindle or extension at the upper end of said piston mounted so that it is capable of a slight rocking or tilting movement relatively to the piston, a resilient means for opposing such rocking or tilting movement of the spindle, and a platform rigidly connected to said spindle.

FRANK ACKERMAN.